United States Patent [19]

Walker

[11] Patent Number: 5,441,929
[45] Date of Patent: Aug. 15, 1995

[54] HYDROCHLORIC ACID ACIDIZING COMPOSITION AND METHOD

[75] Inventor: Michael L. Walker, Duncan, Okla.

[73] Assignee: Halliburton Company, Duncan, Okla.

[21] Appl. No.: 264,818

[22] Filed: Jun. 23, 1994

[51] Int. Cl.$^6$ ............... C09K 7/02; C09K 7/04; E21B 43/27
[52] U.S. Cl. ............... 507/260; 507/934; 507/261; 507/266; 507/267; 507/268; 507/269; 507/939
[58] Field of Search ............... 507/140, 141, 142, 260, 507/261, 266, 267, 268, 269, 933, 934, 939; 252/389.54

[56] References Cited

U.S. PATENT DOCUMENTS

| | | | |
|---|---|---|---|
| 3,121,059 | 2/1964 | De Young | 252/389.54 |
| 4,138,353 | 2/1979 | Lipinski | 252/181 |
| 4,217,216 | 8/1980 | Lipinski | 210/58 |
| 4,498,997 | 2/1985 | Walker | 252/8.55 |
| 4,552,658 | 6/1985 | Walker et al. | 252/389.54 |
| 4,552,672 | 11/1985 | Walker et al. | 252/389.54 |
| 4,798,683 | 1/1989 | Boffardi et al. | 252/389.54 |
| 4,963,290 | 10/1990 | Bressan et al. | 252/387 |
| 5,002,697 | 3/1991 | Crucil et al. | 252/389.23 |
| 5,034,155 | 7/1991 | Soeder et al. | 252/389.23 |
| 5,120,471 | 6/1992 | Jasinski et al. | |

OTHER PUBLICATIONS

Robert S. Glass, "Passivation of Tatanium by Molybdate Ion", *Corrosion,* vol. 41, No. 2, p. 89 (Feb. 1985).

*Primary Examiner*—Gary L. Geist
*Assistant Examiner*—Valerie Fee
*Attorney, Agent, or Firm*—Robert A. Kent; Dougherty, Hessin, Beavers & Gilbert

[57] ABSTRACT

A hydrochloric acid acidizing composition for treating a subterranean formation penetrated by a well bore to increase the production of desired materials (e.g., hydrocarbons) therefrom that includes a corrosion inhibitor for protecting both ferrous based alloy surfaces (e.g., low alloy steel surfaces) and titanium based alloy surfaces associated with the treatment from corrosion by the acid. The corrosion inhibitor includes an effective amount of a first inhibitor component for inhibiting corrosion of ferrous based alloys, the first inhibitor component including at least one chemical reducing compound, and an effective amount of a second inhibitor component for inhibiting corrosion of titanium based alloys, the second inhibitor component including at least one source of molybdate ions such as sodium molybdate. A method of treating a subterranean formation penetrated by a well bore to increase the production of desired materials therefrom is also provided.

20 Claims, No Drawings

HYDROCHLORIC ACID ACIDIZING COMPOSITION AND METHOD

BACKGROUND OF THE INVENTION

1. Field of the Invention

The present invention relates to compositions and methods for acidizing wells such as oil and gas wells in which corrosion inhibitors are employed to lessen the corrosive effects of hydrochloric acid on metal surfaces.

2. Description of the Prior Art

Hydrochloric acid solutions are commonly utilized in treatments carried out to stimulate oil and gas wells. In a general acidizing treatment, an aqueous hydrochloric acid solution is introduced into a subterranean formation to react with acid soluble materials in the formation and enlarge pore spaces in the formation. In a fracture acidizing treatment, a fracture is produced in a subterranean formation and an aqueous hydrochloric acid solution is introduced into the fracture to etch flow channels in the face thereof. The hydrochloric acid solution also enlarges pore spaces in the fracture face and in the formation. Hydrochloric acid solutions are also utilized to merely clean out well bores in order to facilitate the flow of hydrocarbons therethrough.

A problem associated with the treatment of an oil and gas well with a hydrochloric acid solution is corrosion by the solution of metal surfaces of casing, tubing and other equipment in the well bore as well as equipment such as mixing tanks and pumps used in association with the treatment. If corrosion by the solution is not inhibited, the surfaces can be seriously damaged. The expense of repairing or replacing damaged equipment is extremely high. Also, the corrosive action of the solution can substantially neutralize the solution before it enters the formation and result in the undesirable introduction of metal ions into the formation. Corrosion by the solution is exacerbated by high temperature and pressure conditions.

Various hydrochloric acid acidizing compositions that include corrosion inhibitors for diminishing the corrosive effects of the acid on metal-surfaces have been developed and used heretofore. The types of components employed in the corrosion inhibitors vary depending upon the nature of the compositions, the types of metal surfaces involved, associated environmental conditions and so forth.

Equipment formed of titanium based alloys is sometimes used in conjunction with equipment formed of ferrous based alloys such as low alloy steel. For example, in oil and gas wells, titanium based alloys are often used in association with wellhead equipment and down hole tools and tubular goods (e.g., air lift lines) to provide extra strength and corrosion resistance thereto. Due to economic and other reasons, most of the remaining tubular goods and equipment are formed of ferrous based alloys such as low alloy steel.

The use of equipment formed of titanium based alloys together with equipment formed of ferrous based alloys such as low alloy steel presents special problems with respect to inhibiting the corrosive effects of aqueous hydrochloric acid solutions on the surfaces of the equipment. Chemical reducing compounds such as unsaturated carbonyl compounds and unsaturated alcohols, e.g., acetylenic alcohols, are typically used as corrosion inhibitors for ferrous based alloys such as low alloy steel. On the other hand, in order to effectively inhibit corrosion of titanium based alloys in an environment associated with hydrochloric acid, a strong oxidizing agent is required. Unfortunately, reducing compounds for ferrous based alloys are not normally compatible with strong oxidizing agents. For example, although sodium nitrate, a potent oxidizing agent, will sufficiently protect titanium based alloys from corrosion by hydrochloric acid, it will substantially interfere with the reduction characteristics of the reducing compounds and prevent the reducing compounds from protecting the ferrous based alloys. Interaction of the sodium nitrate with the reducing compounds will also diminish the ability of the sodium nitrate to protect the titanium based alloys.

There is a need for a hydrochloric acid acidizing composition that includes a corrosion inhibitor that protects both titanium based alloy surfaces and ferrous based alloy surfaces from the corrosive effects of the acid.

SUMMARY OF THE INVENTION

By the present invention, it has been discovered that both ferrous based alloy surfaces (e.g., low alloy steel surfaces) and titanium based alloy surfaces are protected from corrosion by aqueous solutions comprising hydrochloric acid if the solutions include one or more chemical reducing compounds together with a source of molybdate ions such as sodium molybdate. Surprisingly, sodium molybdate and other sources of molybdate ions do not substantially interfere with the ability of the reducing compound(s) to inhibit corrosion of the ferrous based alloy surfaces, and do not significantly attack the ferrous based alloy surfaces. Even though their oxidizing potential is such that they would not normally be expected to work by themselves, sodium molybdate and other sources of molybdate ions also function to provide excellent corrosion protection to the titanium based alloy surfaces.

Accordingly, in one aspect, the invention is an acidizing composition for treating a well to increase the production of desired materials (e.g., hydrocarbons) therefrom. The composition comprises an aqueous acid solution including at least 2% by weight, based on the total weight of the solution, of hydrochloric acid, and a corrosion inhibitor for inhibiting corrosion of both ferrous based alloy surfaces and titanium based alloy surfaces contacted by the aqueous acid solution. The corrosion inhibitor includes:

an effective amount of a first inhibitor component for inhibiting corrosion of ferrous based alloys, the first inhibitor component including at least one reducing compound; and an effective amount of a second inhibitor component for inhibiting corrosion of titanium based alloys, the second inhibitor component including at least one source of molybdate ions present in an amount of at least 0.1% by weight based on the weight of the aqueous acid solution.

The components of the acidizing composition are preferably different compounds or different mixtures of compounds.

In another aspect, the invention is a method of treating a well with a hydrochloric acid acidizing composition to increase the production of desired materials therefrom whereby corrosive effects of the acidizing composition on both ferrous based alloy surfaces and titanium based alloy surfaces in contact therewith are substantially lessened comprising: introducing into the well bore the inventive acidizing composition described above.

It is, therefore, a principal object of the present invention to provide a hydrochloric acid acidizing composition and method for treating a well to stimulate the production of desired materials therefrom in which corrosion of both ferrous based alloy surfaces and titanium based alloy surfaces is effectively inhibited.

Numerous other objects, features and advantages of the present invention will be readily apparent to those skilled in the art upon a reading of the following disclosure including the accompanying examples.

DESCRIPTION OF PREFERRED EMBODIMENTS

This invention includes an acidizing composition for treating a well to increase the production of desired materials (e.g., oil, gas or sulfur) therefrom. The composition comprises an aqueous hydrochloric acid solution and a corrosion inhibitor for protecting both ferrous based alloy surfaces and titanium based alloy surfaces from the corrosive effects (e.g.; loss of metal and pitting) of the acid. The invention also includes a method of treating a well to increase the production of desired materials therefrom that utilizes the inventive acidizing composition. As used herein and in the appended claims, the term "well" includes the well bore and one or more subterranean formations penetrated thereby.

As used herein and in the appended claims, "ferrous based alloys" means metal alloys that contain at least about 70% by weight iron. Ferrous based alloys include stainless steel (e.g., 13 Cr) and low alloy steel (e.g., N-80 grade). The phrase low alloy steel means a steel containing up to 5% of one or more alloying additives. The inventive acidizing composition is very suitable for use in connection with low alloy steel that includes steel and up to 5% of one or more alloying metals selected from the group consisting of carbon, nickel, chromium, niobium, tungsten, titanium, aluminum, manganese and other suitable alloying metals as known to those skilled in the art. Examples of specific low alloy steels commonly used in forming tubular goods and other equipment for use in association with oil and gas wells are listed in API Specification 5AC, §3 (39th Edition, May 31, 1987).

As used herein and in the appended claims, "titanium based alloys" means metal alloys that contain at least about 60% by weight titanium. The inventive acidizing composition is very suitable for use in connection with titanium based alloys that include at least about 85% by weight titanium. Suitable alloying metals for the titanium based alloys include aluminum, vanadium, nickel, chromium, iron, copper and other suitable metals as known to those skilled in the art. Examples of specific titanium alloys commonly used in forming tubular goods and other equipment for use in association with oil and gas wells are titanium alloys grades 9, 12 and 18 and beta phase alloys including titanium alloys UNS R58640, UNS R58210, palladium stablilized UNS R58640 and palladium stabilized UNS R58210.

The Acidizing Composition

The aqueous hydrochloric acid solution of the inventive acidizing composition includes at least 2% by weight, based on the total weight of the solution, of hydrochloric acid. The aqueous hydrochloric acid solution preferably includes in the range of from about 3% to about 22% by weight, most preferably about 15% by weight, based on the total weight of the solution, of hydrochloric acid. If desired, the solution can also include one or more other acids selected from the group consisting of acetic acid, citric acid, erythorbic acid and formic acid.

The corrosion inhibitor of the inventive acidizing composition includes an effective amount of a first inhibitor component for inhibiting corrosion of ferrous based alloys, the first inhibitor component including at least one reducing compound, and an effective amount of a second inhibitor component for inhibiting corrosion of titanium based alloys, the second inhibitor component including at least one source of molybdate ions present in an amount of at least 0.1% by weight based on the weight of the aqueous acid solution. As used herein and in the appended claims, "an effective amount" refers to that amount of the corresponding inhibitor component necessary to inhibit corrosion by the aqueous acid solution of the surfaces in question, e.g., the amount of the first inhibitor component necessary to inhibit corrosion by the aqueous acid solution of ferrous based alloy surfaces.

The first inhibitor component functions to inhibit corrosion of ferrous based alloy surfaces by diminishing the rate at which metal ions from the ferrous based alloy surfaces are placed into the aqueous acid solution by the hydrochloric acid. As used herein and in the appended claims, "reducing compound" means a compound capable of readily giving up electrons. Examples of reducing compounds suitable for the first inhibitor component include unsaturated carbonyl compounds, unsaturated ether compounds, unsaturated alcohols, quaternary ammonium compounds, quaternary nitrogen heterocycles, condensation products formed by reacting an aldehyde in the presence of a carbonyl compound, and condensation products formed by reacting an aldehyde in the presence of a carbonyl compound and a nitrogen-containing compound and a carbonyl compound.

Examples of suitable unsaturated carbonyl compounds include 1-phenyl-1-ene-3-butanone and cinnamaldehyde.

An example of a suitable unsaturated ether compound is 1-phenyl-3-methoxy-1-propene.

Suitable unsaturated alcohols include acetylenic alcohols. Examples of acetylenic alcohols that can be used include acetylenic compounds having the general formula:

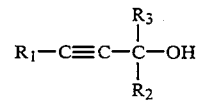

wherein $R_1$, $R_2$ and $R_3$ are hydrogen, alkyl, phenyl, substituted phenyl or hydroxy-alkyl radicals. Preferably, $R_1$ comprises a hydrogen radical. Preferably, $R_2$ comprises a hydrogen, methyl, ethyl or propyl radical. Preferably, $R_3$ comprises an alkyl radical having the general formula $C_nH_{2n}$ where n is an integer from 1 to 10. Specific examples include methyl butynol, methyl pentynol, hexynol, ethyl octynol, propargyl alcohol, benzylbutynol, ethynylcyclohexanol and the like. Preferred alcohols are hexynol, propargyl alcohol, methyl butynol and ethyl octynol.

Examples of suitable quaternary ammonium compounds include aromatic nitrogen compounds such as alkylpyridine-N-methyl chloride, alkylpyridine-N-benzyl chloride, alkylquinoline-N-benzyl chloride, alkylisoquinoline quaternary compounds, benzoquinoline quaternary compounds, chloromethylnaphthalene quaternary compounds such as chloromethylnaphthyl quinoline chloride and mixtures of the above compounds. The alkyl group associated with the pyridine compounds can contain from one to about six carbon atoms and the alkyl group associated with the quinoline compounds can contain from one to about eight carbon atoms.

Examples of suitable quaternary nitrogen heterocycles include substituted pyridines (e.g., methyl pyridine) and substituted quinolines (e.g., 2-methyl quinoline).

Examples of suitable condensation products formed by reacting an aldehyde in the presence of a nitrogen-containing compound and a carbonyl compound are described in U.S. Pat. No. 3,077,454 to Monroe et al. which is incorporated by reference herein.

The first inhibitor component preferably includes at least one reducing compound selected from the group consisting of unsaturated carbonyl compounds, unsaturated ether compounds, acetylenic alcohols, quaternary nitrogen heterocycles and condensation products formed by reacting formaldehyde in the presence of a nitrogen-containing compound and a carbonyl compound. Such compounds are particularly effective in inhibiting corrosion of low alloy steel by hydrochloric acid solutions at high temperatures (e.g., 250° F. and up). The first inhibitor component most preferably consists of a mixture of one or more acetylenic alcohols, one or more alkenyl carbonyls and one or more derivatized nitrogen heterocycles together with one or more solvents and one or more dispersants.

Although the exact mechanism is not clear, it is believed that the second inhibitor component of the corrosion inhibitor of the inventive acidizing composition functions to initiate, repair, restore and/or maintain a passive oxide layer on titanium based alloy surfaces. The second inhibitor component preferably includes at least one source of molybdate ions selected from the group consisting of molybdic acid, salts of molybdic acid, molybdenum oxides such as molybdenum trioxide ($MoO_3$), phosphomolybdic acid and salts of phosphomolybdic acid. Such compounds are compatible with the first inhibitor component and have a solubility in water of at least about 0.1 at a temperature of 20° C. As used herein and in the appended claims, a source of molybdate ions that is "compatible with the first inhibitor component" is a source of molybdate ions that does not substantially interfere with the ability of the first inhibitor component to inhibit corrosion of ferrous based alloy surfaces. Examples of salts of molybdic acid that can be used include ammonium molybdate $((NH_4)_6Mo_7O_{24} \cdot 4H_2O)$, magnesium molybdate ($MgMoO_4$) and alkali metal molybdates such as sodium molybdate ($Na_2MoO_4$) and potassium molybdate ($K_2MoO_4$). An example of a salt of phosphomolybdic acid is sodium phosphomolybdate ($Na_3PO_4 \cdot 12MoO_3$). The second inhibitor component more preferably includes at least one source of molybdate ions selected from the group consisting of ammonium molybdate and alkali metal molybdates. Such compounds very effectively initiate, repair, restore and/or maintain a passive oxide layer on the titanium based alloy surfaces in the presence of hydrochloric acid. Most preferably, the second inhibitor is sodium molybdate.

The exact amounts of the first inhibitor component and the second inhibitor component employed in the corrosion inhibitor of the inventive acidizing composition will vary depending upon the total surface areas of the surfaces to be protected, the degree of corrosion inhibition desired for the particular application, the volume, type and concentration of the aqueous acid solution involved, the temperature of the associated environment and/or other factors as known to those skilled in the art. In order for the corrosion inhibitor to sufficiently protect the titanium based alloy surfaces, it is important for a source(s) of molybdate ions to be present in the composition in an amount of at least about 0.1% by weight based on the weight of the aqueous acid solution.

In addition, solvents, surfactants (e.g., dispersing agents) and other components commonly used in acidizing compositions as known to those skilled in the art can be included in the inventive acidizing composition to broaden the utility of the composition, enhance the effectiveness of the composition and/or facilitate the use thereof provided such optional components do not substantially interfere with the performance of the remaining components of the composition.

For example, a solvent such as an alkyl alcohol, glycol or mixture thereof can be employed in the inventive acidizing composition to assist in maintaining the various components of the composition as a homogenous mixture. Examples of alkyl alcohols and glycols that can be used include methyl alcohol, ethyl alcohol, propyl alcohol, isopropyl alcohol, butyl alcohol, pentyl alcohol, hexyl alcohol, heptyl alcohol, octyl alcohol, ethylene glycol, propylene glycol and higher liquid members of the group of aliphatic alcohols. Preferably, the alkyl alcohol, glycol or mixture thereof is added to the composition in an amount no greater than that which is sufficient to maintain the components as a homogenous admixture. Generally, the alkyl alcohol, glycol or mixture thereof is used in an amount less than about 70% by volume based on the volume of the aqueous acid solution in order to avoid unnecessary dilution of the composition.

One or more dispersing surfactants can be included in the inventive acidizing composition to facilitate dispersion of the corrosion inhibitor components in the aqueous acid solution. Due to their inert nature, nonionic surfactants are preferred. Examples of suitable nonionic surfactants include ethoxylated oleates, tall oils and ethoxylated fatty acids. Ethylene oxide adducts of octylphenol, nonylphenyl, tridecylphenol and the like ethoxylated with from about 8 at about 20 moles of ethylene oxide per mole are preferred. Nonylphenol ethoxylated with about 8 to about 20 moles of ethylene oxide per mole is particularly suitable. Preferably, the dispersing surfactant or surfactants are added to the composition in an amount less than about 20% by volume based on the volume of the aqueous acid solution in order to avoid unnecessary dilution of the corrosion inhibiting composition.

For example, in one embodiment, the inventive acidizing composition consists of an aqueous acid solution including 15% by weight, based on the total weight of the solution, of hydrochloric acid; in the range of from about 0.1% to about 3.0% by volume, more preferably from about 0.1% to about 2.0% by volume, based on the volume of the aqueous acid solution, of a mixture of one or more acetylenic alcohols, one or more alkenyl carbonyls and one or more derivatized nitrogen heterocycles together with one or more solvents and one or more dispersants for inhibiting corrosion of ferrous based alloys; and in the range of from about 0.1% to about 5% by weight, more preferably from about 0.1% to about 2.5% by weight, based on the weight of the aqueous acid solution, of sodium molybdate for inhibiting corrosion of titanium based alloys.

The inventive acidizing composition can be prepared in any suitable tank equipped with suitable mixing means as known to those skilled in the art. The composition may be transferred either at a controlled rate directly into the well bore or into a convenient storage tank for injection down the well bore.

The Inventive Method

The inventive method of treating a well (including the well bore and/or one or more subterranean formations penetrated thereby) to increase the production of desired materials therefrom is generally carried out by pumping the inventive acidizing composition through tubular goods disposed in the well bore and, if desired, into a subterranean formation to be treated. The corrosion inhibitor of the composition inhibits corrosion of both the ferrous based and titanium based alloy surfaces of the tubular goods and other equipment contacted by the acidizing composition during the treatment.

The pumping rate and pressure utilized in carrying out the inventive method will depend upon the characteristics of the formation and whether or not fracturing of the formation is desired. After the inventive acidizing composition has been injected, the well may be shut in and allowed to stand for a period of several hours or more depending on the concentration and types of acid employed and the formation treated. If there is pressure on the well, the acidizing composition can be produced back for removal at the surface by releasing the pressure and allowing the composition to flow back into the well bore and to the surface.

Thus, the present invention provides a hydrochloric acid acidizing composition and method that utilize a single inhibitor system for protecting both ferrous based alloy surfaces and titanium based alloy surfaces from the corrosive effects of the acid. Such a system embodies many advantages. For example, a well containing low alloy steel casing and titanium based alloy air lift lines can be acidized with a hydrochloric acid solution without having to first remove the air lift lines. The corrosion inhibitor of the inventive acidizing composition diminishes the corrosive effects of the hydrochloric acid solution without decreasing the effectiveness of the solution in treating the well.

The effectiveness of the inventive acidizing composition including the corrosion inhibitor thereof is not diminished by high temperature and pressure conditions such as can be encountered deep in subterranean formations. As shown by the examples, the corrosion inhibitor of the inventive composition protects both ferrous based alloys and titanium based alloys from corrosion by a 15% by weight hydrochloric acid solution at 300° F.

In order to further illustrate the compositions and methods of the present invention, the following examples are given.

Tests were carried out to demonstrate the effectiveness of the corrosion inhibitor of the inventive acidizing composition in protecting both ferrous based alloys and titanium based alloys at temperatures ranging from 200°–300° F.

First, a sufficient quantity of concentrated hydrochloric acid was combined with water to form an aqueous acid solution containing 15% by weight, based on the total weight of the solution, of hydrochloric acid. The hydrochloric acid solution was then divided into samples, and one or both of the first inhibitor component and second inhibitor component of the corrosion inhibitor of the inventive acidizing composition were added to each sample.

The first inhibitor component used in the tests consisted of a mixture of one or more acetylenic alcohols, one or more alkenyl carbonyls and one or more derivatized nitrogen heterocycles together with one or more solvents and one or more dispersants, the mixture being sold by Halliburton Energy Services of Duncan, Okla. in association with the trade designation "HAI-85M". The second inhibitor component used in the tests consisted of sodium molybdate ($Na_2MoO_4$). Various amounts of the first and second inhibitor components were employed.

A weighed sample coupon formed of N-80 grade low alloy steel and a weighed sample coupon formed of titanium alloy palladium stabilized UNS R58640 were suspended in each sample. The ratio of the volume of the samples to the total surface areas of the coupons was about 25 cc/inch$^2$.

Three of the samples were heated to about 200° F. under atmospheric pressure. Three more of the samples were subjected to a pressure of about 600 psi and heated to about 250° F. The remaining three samples were subjected to a pressure of about 600 psi and heated to about 300° F. After varying amounts of time, the coupons were removed from the samples, washed and separately weighed to determine the corrosion loss. The corrosion loss experienced by each coupon was determined by the following formula:

Corrosion loss = $(W_1-W_2)/A$ wherein $W_1$ equals the initial weight of the coupon, (g); $W_2$ equals the final weight of the coupon, (g); and A equals a factor for converting grams of metal loss per square inch to pounds of metals per square foot and is equal to 14.08.

The results of the tests are set forth in Table I below:

TABLE I

| Corrosive Fluid ... 15% HCl Pressure ... Atmospheric at 200° F. 600 psi above 200° F. | | | | |
|---|---|---|---|---|
| Temp. °F. | Time (Hrs.) | 1st Inhibitor Conc.[1] | 2nd Inhibitor Conc. $(Na_2MoO_4)$[2] | Corrosion Loss in lb/(ft)$^2$ |
| | | | | Fe[3]  Ti[4] |
| 200 | 8 | 0.3% | — | 0.008  0.058 |
| 200 | 8 | — | 1.6% | 0.704  0.001 |
| 200 | 8 | 0.3% | 1.6% | 0.052  0.001 |
| 200 | 8 | — | — | 0.551  0.010 |
| 200 | 6 | 0.6% | — | 0.008  0.151 |
| 200 | 6 | — | 1.6% | 0.733  0.002 |
| 200 | 6 | 0.6% | 1.6% | 0.040  0.008 |
| 250 | 6 | — | — | 0.715  0.021 |
| 300 | 2 | 2.0% | — | 0.030  0.131 |
| 300 | 2 | — | 1.6% | 0.763  0.003 |
| 300 | 2 | 2.0% | 1.6% | 0.035  0.004 |

TABLE I-continued

Corrosive Fluid ... 15% HCl
Pressure ... Atmospheric at 200° F.
600 psi above 200° F.

| Temp. °F. | Time (Hrs.) | 1st Inhibitor Conc.[1] | 2nd Inhibitor Conc. (Na$_2$MoO$_4$)[2] | Corrosion Loss in lb/(ft)$^2$ Fe[3] | Ti[4] |
|---|---|---|---|---|---|
| 300 | 2 | — | — | 0.782 | 0.065 |

[1] The percent by volume of the first inhibitor component in the sample based on the volume of the aqueous acid solution in the sample.
[2] The percent by weight of the second inhibitor component in the sample (sodium molybdate) based on the weight of the aqueous acid solution in the sample.
[3] Low alloy steel N-80 grade.
[4] Titanium alloy palladium stabilized UNS R58640.

The results of the tests show that the corrosion inhibitor of the inventive acidizing composition effectively inhibited corrosion by the hydrochloric acid of both the ferrous based alloy coupons and the titanium based alloy coupons at temperatures as high as 300° F. and pressures as high as 600 psi. The sodium molybdate sufficiently inhibited corrosion of the titanium based alloy coupons without substantially interfering with the ability of the reducing compounds to inhibit corrosion of the ferrous based alloy coupons.

EXAMPLE II

The tests described in Example I carried out at 250° F. were repeated using sodium nitrate in place of the sodium molybdate.

A sufficient quantity of concentrated hydrochloric acid was combined with water to form an aqueous acid solution containing 15% by weight, based on the total weight of the solution, of hydrochloric acid. The hydrochloric acid solution was then divided into samples, and one or both of a first inhibitor component and a second inhibitor component were added to each sample. The first inhibitor component used in the tests was "HAI-85M", as described in Example I. The second inhibitor component used in the tests consisted of sodium nitrate (NaNO$_3$). Sodium nitrate has a reduction potential of 940 millivolts (mv) as defined using a standard hydrogen electrode. By comparison, sodium molybdate has a reduction potential of zero millivolts (mv) as defined using a standard hydrogen electrode.

A weighed sample coupon formed of N-80 grade low alloy steel and a weighed sample coupon formed of titanium alloy palladium stabilized UNS R58640 were suspended in each sample. The ratio of the volume of the samples to the total surface areas of the coupons was about 25 cc/inch$^2$. The samples were subjected to a pressure of about 600 psi and heated to about 250° F. After about six hours, the coupons were removed from the samples, washed and separately weighed to determine the corrosion loss. The corrosion loss experienced by each coupon was determined in accordance with the formula set forth in Example I.

The results of the tests are shown in Table II below.

TABLE II

Corrosive Fluid ... 15% HCl
Pressure ... 600 psi

| Temp. °F. | Time (Hrs.) | 1st Inhibitor Conc.[1] | 2nd Inhibitor Conc. (Na$_2$MoO$_4$)[2] | Corrosion Loss in lb/(ft)$^2$ Fe[3] | Ti[4] |
|---|---|---|---|---|---|
| 250 | 6 | — | — | 0.715 | 0.021 |
| 250 | 6 | 0.6% | — | 0.008 | 0.151 |
| 250 | 6 | — | 1.6% | 0.773 | 0.001 |
| 250 | 6 | 0.6% | 1.6% | 0.746 | 0.010 |

[1] The percent by volume of the first inhibitor component in the sample based on the volume of the aqueous acid solution in the sample.
[2] The percent by weight of the second inhibitor component in the sample (sodium nitrate) based on the weight of the aqueous acid solution in the sample.
[3] Low alloy steel N-80 grade.
[4] Titanium alloy palladium stabilized UNS R58640.

The results of the tests show that unlike sodium molybdate, the sodium nitrate substantially interfered with the ability of the reducing compounds (the first inhibitor component) to inhibit corrosion of the ferrous based alloy coupons. Interaction of the sodium nitrate with the reducing compounds also diminished the ability of the sodium nitrate to inhibit corrosion of the titanium based alloy coupons.

EXAMPLE III

The tests described in Example I carried out at 300° F. were repeated using sulfuric acid in place of hydrochloric acid.

First, a sufficient quantity of concentrated sulfuric acid was combined with water to form an aqueous solution containing 8.5% by weight, based on the total weight of the solution, of sulfuric acid (equivalent to 15% by weight hydrochloric acid). The sulfuric acid solution was then divided into samples, and one or both of a first inhibitor component and a second inhibitor component were added to each sample. The first inhibitor component used in the tests was "HAI-85M", as described in Example I. The second inhibitor component used in the tests consisted of sodium molybdate (Na$_2$MoO$_4$).

A weighed sample coupon formed of N-80 grade low alloy steel and a weighed sample coupon formed of titanium alloy palladium stabilized UNS R58640 were suspended in each sample. The ratio of the volume of the samples to the total surface areas of the coupons was about 25 cc/inch$^2$. The samples were subjected to a pressure of about 600 psi and heated to about 300° F. After about two hours, the coupons were removed from the samples, washed and separately weighed to determine the corrosion loss. The corrosion loss experienced by each coupon was determined in accordance with the formula set forth in Example I.

The results of the tests are shown in Table III below.

TABLE III

Corrosive Fluid ... 8.5% H$_2$SO$_4$
Pressure ... 600 psi

| Temp. °F. | Time (Hrs.) | 1st Inhibitor Conc.[1] | 2nd Inhibitor Conc. (Na$_2$MoO$_4$)[2] | Corrosion Loss in lb/(ft)$^2$ Fe[3] | Ti[4] |
|---|---|---|---|---|---|
| 300 | 2 | — | — | 0.768 | 0.190 |
| 300 | 2 | 2.0 | 1.6 | 0.264 | 0.001 |
| 300 | 2 | 2.0 | — | 0.015 | 0.188 |

TABLE III-continued

Corrosive Fluid ... 8.5% H$_2$SO$_4$
Pressure ... 600 psi

| Temp. °F. | Time (Hrs.) | 1st Inhibitor Conc.[1] | 2nd Inhibitor Conc. (Na$_2$MoO$_4$)[2] | Corrosion Loss in lb/(ft)$^2$ Fe[3] | Ti[4] |
|---|---|---|---|---|---|
| 300 | 2 | — | 1.6 | 0.546 | 0.001 |

[1] The percent by volume of the first inhibitor component in the sample based on the volume of the aqueous acid solution in the sample.
[2] The percent by weight of the second inhibitor component in the sample (sodium molybdate) based on the weight of the aqueous acid solution in the sample.
[3] Low alloy steel N-80 grade.
[4] Titanium alloy palladium stabilized UNS R58640.

The results of the tests show that in the presence of the sodium molybdate, the reducing compounds did not sufficiently protect the ferrous based alloy coupon from the corrosive effects of the sulfuric acid. Table I shows that both the titanium based alloy coupon and the ferrous based alloy coupon were protected from the corrosive effects of hydrochloric acid under the same test conditions.

EXAMPLE IV

Additional tests were carried out to compare the effectiveness of sodium molybdate to the effectiveness of other oxidizing agents.

First, a sufficient quantity of concentrated hydrochloric acid was combined with water to form an aqueous acid solution containing 15% by weight, based on the total weight of the solution, of hydrochloric acid. The hydrochloric acid solution was then divided into samples, and one or both of a first inhibitor component and a second inhibitor component were added to each sample.

The first inhibitor component used in the tests was "HAI-85M", as described in Example I. The second inhibitor component used in the tests varied as shown below:

| | | |
|---|---|---|
| A | Sodium chromate | (Na$_2$CrO$_4$.H$_2$O) |
| B | Ferric chloride | (FeCl$_3$.6H$_2$O) |
| C | Cupric chloride | (CuCl$_2$) |
| D | Hypophosphorous Acid | (H$_3$PO$_2$) |
| E | Stannic chloride | (SnCl$_4$) |
| F | Bismuth trichloride | (BiCl$_3$) |
| G | Sodium molybdate | (Na$_2$MoO$_4$) |

A weighed sample coupon formed of titanium alloy palladium stabilized UNS R58640 was suspended in each sample. The ratio of the volume of the sample to the total surface area of the coupon was about 25 cc/inch$^2$.

Each sample was subjected to a pressure of about 600 psi and heated to about 250° F. After approximately six hours, the coupons were removed from the samples, washed and separately weighed to determine the corrosion loss. The corrosion loss experienced by each coupon was determined in accordance with the formula set forth in Example I above.

The results of the tests are shown in Table IV below:

TABLE IV

Corrosive Fluid ... 15% HCl
Pressure ... 600 psi
Temperature ... 250° F.
Time ... 6 hours

| 1st Inhibitor Conc.[1] | 2nd Inhibitor Component | 2nd Inhibitor Conc.[2] | 2nd Inhibitor Red. Pot. (mv)[3] | Corrosion Loss in lb/(ft)$^2$ Ti[4] |
|---|---|---|---|---|
| 0.6% | A | 1.17% | 1,195 | 0.113 |
| — | A | 1.17% |  | 0.006 |
| 0.6% | B | 1.35% | 770 | 0.089 |
| — | B | 1.35% |  | 0.054 |
| 0.6% | C | 0.85% | 158 | 0.116 |
| — | C | 0.85% |  | 0.030 |
| 0.6% | D | 0.53% | −510 | 0.100 |
| — | D | 0.53% |  | 0.105 |
| 0.6% | E | 1.0% | 139 | 0.151 |
| — | E | 1.0% |  | 0.156 |
| 0.6% | F | 1.0% | 160 | 0.129 |
| — | F | 1.0% |  | 0.087 |
| 0.6% | G | 1.6% | 0 | 0.008 |
| — | G | 1.6% |  | 0.002 |

[1] The percent by volume of the first inhibitor component in the sample based on the volume of the aqueous acid solution in the sample.
[2] The percent by weight of the second inhibitor component in the sample based on the weight of the aqueous acid solution in the sample. Approximately 5 millimoles of the second inhibitor component were used in each test.
[3] The standard reduction potential (millivolts) as defined using a standard hydrogen electrode.
[4] Titanium alloy palladium stabilized UNS R58640.

The results of the tests show that although sodium chromate, ferric chloride and cupric chloride inhibited corrosion of the titanium based alloy coupons when used by themselves, they were not effective when used in association with reducing compounds (the first inhibitor component). Interaction of the sodium chromate, ferric chloride and cupric chloride with the reducing compounds diminished their ability to protect the titanium based alloys. The hypophosphorous, stannic chloride and bismuth trichloride were not very effective in inhibiting corrosion of the titanium based alloy coupons, either by themselves or in the presence of the reducing compounds. Only the sodium molybdate effectively inhibited corrosion of the titanium based alloy coupons both by itself and in the presence of the reducing compounds. The results also show that despite the fact that it has a reduction potential (SHE) of zero, sodium molybdate decreased the corrosion of the titanium based alloy coupons to a very low level. Based on its reduction potential, one Would have expected the sodium molybdate to perform more like the hypophosphorous and stannic chloride.

Thus, the present invention is well adapted to carry out the objects and attain the ends and advantages mentioned as well as those which are inherent therein. The preceding examples can be repeated with similar success by substituting the generically or specifically described components and/or operating conditions of this invention for those used in the examples.

Furthermore, although certain preferred embodiments of the invention have been described for illustrative purposes, it will be appreciated that various modifications and innovations of the composition and method recited herein may be effected without departure from the basic principals which underlie the invention. Changes of this type are therefore deemed to lie within the spirit and scope of the invention except as may be necessarily limited by the appended claims and reasonable equivalents thereof.

What is claimed is:

1. An acidizing composition for treating a well to increase the production of desired materials therefrom comprising:
   - an aqueous acid solution including at least 2% by weight, based on the total weight of the solution, of hydrochloric acid; and
   - a corrosion inhibitor for inhibiting corrosion of both ferrous based alloy surfaces and titanium based alloy surfaces contacted by the aqueous acid solution, the corrosion inhibitor including:
   - an effective amount of a first inhibitor component for inhibiting corrosion of ferrous based alloys, the first inhibitor component including at least one reducing compound; and
   - an effective amount of a second inhibitor component for inhibiting corrosion of titanium based alloys, the second inhibitor component including at least one source of molybdate ions present in an amount of at least 0.1% by weight based on the weight of said aqueous acid solution, wherein said first inhibitor component and said second inhibitor component are different compounds and said first inhibitor component does not comprise a source of molybdate ions.

2. The composition of claim 1 wherein said aqueous acid solution further includes at least one other acid selected from the group consisting of acetic acid, citric acid, erythorbic acid and formic acid.

3. The composition of claim 1 wherein said aqueous acid solution includes in the range of from about 3% to about 20% by weight, based on the total weight of the solution, of hydrochloric acid.

4. The composition of claim 1 wherein said first inhibitor component includes at least one reducing compound selected from the group consisting of unsaturated aldehydes or ketones, unsaturated ether compounds, unsaturated alcohols, quaternary aromatic ammonium compounds, quaternary nitrogen heterocycles, condensation products formed by reacting an aldehyde in the presence of a carbonyl compound and condensation products formed by reacting an aldehyde in the presence of a nitrogen-containing compound and a carbonyl compound, said aldehyde and said carbonyl compound being different and said reaction occurring at a temperature in the range of from about 140° F. to 250° F. for a time in the range of from about 4 to about 48 hours.

5. The composition of claim 4 wherein said first inhibitor component includes at least one reducing compound selected from the group consisting of unsaturated aldehydes or ketones, unsaturated ether compounds, acetylenic alcohols, quaternary nitrogen heterocycles and condensation products formed by reacting formaldehyde in the presence of a nitrogen-containing compound and a carbonyl compound, said aldehyde and said carbonyl compound being different and said reaction occurring at a temperature in the range of from about 140° F. to 250° F. for a time in the range of from about 4 to about 48 hours.

6. The composition of claim 5 wherein said first inhibitor component consists of a mixture of at least one acetylenic alcohol, at least one unsaturated aldehyde or ketone, at least one aromatic quaternary nitrogen heterocycle, at least one solvent and at least one dispersant.

7. The composition of claim 1 wherein said second inhibitor component includes at least one source of molybdate ions selected from the group consisting of molybdic acid, salts of molybdic acid, molybdenum oxides, phosphomolybdic acid and salts of phosphomolybdic acid.

8. The composition of claim 7 wherein said second inhibitor component includes at least one source of molybdate ions selected from the group consisting of ammonium molybdate and alkali metal molybdates.

9. The composition of claim 8 wherein said second inhibitor component is sodium molybdate.

10. The composition of claim 1 further comprising a surfactant for facilitating dispersion of said first inhibitor component and said second inhibitor component of said corrosion inhibitor in said aqueous acid solution.

11. The composition of claim 10 wherein said surfactant is nonylphenol ethoxylated with in the range of from about 8 to about moles of ethylene oxide per mole.

12. The composition of claim 1 further comprising a solvent selected from the group consisting of an alkyl alcohol, a glycol and a mixture thereof to assist in maintaining the components of the composition as a homogenous mixture.

13. A method of treating a well with a hydrochloric acid acidizing composition to increase the production of desired materials therefrom whereby corrosive effects of the acidizing composition on both ferrous based alloy surfaces and titanium based alloy surfaces in contact therewith are reduced comprising:
   - introducing into the well bore an acidizing composition including:
     - an aqueous acid solution including at least 2% by weight, based on the total weight of the solution, of hydrochloric acid; and
     - a corrosion inhibitor including:
       - an effective amount of a first inhibitor component for inhibiting corrosion of ferrous based alloys, the first inhibitor component including at least one reducing compound; and
       - an effective amount of a second inhibitor component for inhibiting corrosion of titanium based alloys, the second inhibitor component including at least one source of molybdate ions present in an amount of at least 0.1% by weight based on the weight of said aqueous acid solution, wherein said first inhibitor component and said second inhibitor component are different compounds and said first inhibitor component does not comprise a source of molybdate ions.

14. The methods of claim 13 wherein said aqueous acid solution of said acidizing composition further includes at least one other acid selected from the group consisting of acetic acid, citric acid, erythorbic acid and formic acid.

15. The method of claim 13 wherein said aqueous acid solution includes in the range of from about 3% to about 20% by weight, based on the total weight of the solution, of hydrochloric acid.

16. The method of claim 13 wherein said first inhibitor component includes at least one reducing compound selected from the group consisting of unsaturated aldehydes or ketones, unsaturated ether compounds, unsaturated alcohols, quaternary aromatic ammonium compounds, quaternary nitrogen heterocycles, condensation products formed by reacting an aldehyde in the presence of a carbonyl compound and condensation products formed by reacting an aldehyde in the presence of a nitrogen-containing compound and a carbonyl compound, said aldehyde and said carbonyl compound being different and said reaction occurring at a temperature in the range of from about 140° F. to 250° F. for a time in the range of from about 4 to about 48 hours.

17. The method of claim 16 wherein said first inhibitor component consists of a mixture of at least one acetylenic alcohol, at least one unsaturated aldehyde or ketone, at least one aromatic quaternary nitrogen heterocycle, at least one solvent and at least one dispersant.

18. The method of claim 13 wherein said second inhibitor component of said acidizing composition includes at least one source of molybdate ions selected from the group consisting of molybdic acid, salts of molybdic acid, molybdenum oxides, phosphomolybdic acid and sales of phosphomolybdic acid.

19. The method of claim 18 wherein said second inhibitor component is sodium molybdate.

20. The method of claim 13 wherein said acidizing composition further includes a surfactant for facilitating dispersion of said first inhibitor component and said second inhibitor component of said corrosion inhibitor in said aqueous acid solution.

* * * * *